(12) United States Patent
Liu et al.

(10) Patent No.: US 10,821,715 B2
(45) Date of Patent: Nov. 3, 2020

(54) 3D PROCESSING DEVICE AND METHOD THEREOF

(71) Applicant: NANCHANG O-FILM OPTICAL TECHNOLOGY CO., LTD, Nanchang (CN)

(72) Inventors: Wei Liu, Nanchang (CN); Genchu Tang, Nanchang (CN); Bin Tang, Nanchang (CN)

(73) Assignee: NANCHANG O-FILM OPTICAL TECHNOLOGY CO., LTD, Nanchang (CN)

(*) Notice: Subject to any disclaimer, the term of this patent is extended or adjusted under 35 U.S.C. 154(b) by 535 days.

(21) Appl. No.: 15/600,725

(22) Filed: May 20, 2017

(65) Prior Publication Data
US 2018/0079116 A1 Mar. 22, 2018

(30) Foreign Application Priority Data
Sep. 22, 2016 (CN) .......................... 2016 1 0841537

(51) Int. Cl.
| | |
|---|---|
| B32B 37/10 | (2006.01) |
| B32B 37/00 | (2006.01) |
| B29C 63/16 | (2006.01) |
| B32B 38/18 | (2006.01) |
| B32B 41/00 | (2006.01) |
| B29C 65/44 | (2006.01) |
| B29C 63/18 | (2006.01) |

(Continued)

(52) U.S. Cl.
CPC ............ *B32B 37/10* (2013.01); *B29C 43/021* (2013.01); *B29C 63/16* (2013.01); *B29C 63/182* (2013.01); *B29C 65/44* (2013.01); *B29C 66/02* (2013.01); *B29C 66/301* (2013.01); *B32B 37/0007* (2013.01); *B32B 38/1866* (2013.01); *B32B 41/00* (2013.01); *B29C 33/046* (2013.01); *B29C 66/00143* (2013.01); *B30B 5/02* (2013.01); *B30B 9/22* (2013.01); *B32B 2457/208* (2013.01); *C08J 5/121* (2013.01)

(58) Field of Classification Search
CPC ....... B29C 63/182; B29C 65/44; B32B 37/10; B30B 5/02; B30B 9/22
See application file for complete search history.

(56) References Cited

U.S. PATENT DOCUMENTS

| | | | | |
|---|---|---|---|---|
| 4,124,242 A | * | 11/1978 | Canner | .................. B29C 31/08 221/214 |
| 5,427,518 A | * | 6/1995 | Morizot | ................ B29C 31/085 100/211 |

(Continued)

*Primary Examiner* — Christopher T Schatz
(74) *Attorney, Agent, or Firm* — Franklin & Associates International Inc; Matthew Lambrinos

(57) ABSTRACT

A 3D processing device configured to attach a decorative film on a surface of a 3D glass, the 3D processing device includes a decorative film pre-deformation unit and a attachment unit. The decorative film pre-deformation unit includes an upper mould and a lower mould opposite to the upper mould, wherein the upper mould engages the lower mould to press the decorative film and cause the decorative film to have a shape matching a surface of the 3D glass. The attachment unit defines a sealing chamber, and includes a mould and a gas bag within the sealing chamber, wherein the mould is configured to support the 3D glass. The present disclosure further provides a method thereof.

9 Claims, 3 Drawing Sheets

(51) Int. Cl.
  *B29C 43/02* (2006.01)
  *B29C 65/00* (2006.01)
  *B30B 5/02* (2006.01)
  *B30B 9/22* (2006.01)
  *B29C 33/04* (2006.01)
  *C08J 5/12* (2006.01)

(56) References Cited

U.S. PATENT DOCUMENTS

2012/0247664 A1* 10/2012 Kobayashi ............. H01L 24/75
  156/285
2014/0096892 A1* 4/2014 Cho .................. B32B 37/14
  156/99

* cited by examiner a decorative film pre-deformation unit is provided, the decorative film pre-deformation unit is provided with an upper mould and a lower mould therein, the upper mould engages the lower mould to pre-deform the flat decorative film, and a pre-deformation decorative film matching a shape of the surface of the 3D glass is obtained

—S101 the pre-deformed decorative film is provided for the attachment unit, the attachment unit defines a sealing chamber and includes a mould and a gas bag within the sealing chamber, the 3D glass is positioned on the mould, and the gas bag attaches the deformed decorative film to the surface of the 3D glass

3D PROCESSING DEVICE AND METHOD THEREOF

CROSS REFERENCE TO RELATED APPLICATION

This application claims priority under 35 U.S.C. § 119 to Chinese Patent Application No. 201610841537.X, filed on Sep. 22, 2016. The entire teachings of the above application are incorporated herein by reference.

FIELD OF THE INVENTION

The present disclosure relates to electronic devices, and more particularly, relates to a device and a method for processing a decorative film on a 3D glass which is served as a housing of an electronic product,

BACKGROUND OF THE INVENTION

With the development of electronic devices such as smart phone and smart watch, which are provided with a touch screen, various manufacturers are scrambled to launch differentiated devices, hoping to attract consumers. A highlight design emerged in the current market is that, the housing of the electronic device is configured to have a curved housing, i.e. the surface of the housing is no longer a flat surface, but a 3D stereoscopic curved surface. The electronic device having a curved housing can fit the hand of the user better, providing a comfortable sensation for holding and handling the electronic device. If the watch housing is configured to be a curved housing, it can fit the wrist of the user better, providing a comfortable sensation for wearing the watch. Furthermore, when a display housing having the curved configuration, the displaying content displayed on the display can have an intense stereoscopic impression, and a perception can thereby be improved. Because glass has a better tactile sensation, when it serves as the materials of the housing of the electronic device, the electronic device meets a great favor. The traditional method for attaching a decorative film on the planar glass is a rolling processing method or a gas bag processing method. However, the method cannot be applied to attach a decorative film on a 3D glass. Aforementioned processing method causes a wrinkle of the decorative film on the surface edges of the 3D glass, thereby affecting the processing effect of the 3D glass.

SUMMARY

Accordingly, it is necessary to provide a 3D processing device and a method, which address the problems emerging in attaching a decorative film on a surface of a 3D glass surface.

A 3D processing device for attaching a decorative film on a surface of a 3D glass, the 3D processing device includes: a decorative film pre-deformation unit including: an upper mould and a lower mould opposite to the upper mould, wherein the upper mould engages the lower mould to press the decorative film and causes the decorative film to have a shape matching a surface of the 3D glass and an attachment unit defines a sealing chamber, and includes a mould and a gas bag within the sealing chamber, wherein the mould is configured to support the 3D glass, the air bag is configured to attach a deformed decorative film provided by the decorative film pre-deformation unit on the surface of the 3D glass.

A 3D glass decorative film processing method, includes: providing a decorative film pre-deformation unit, wherein the decorative film pre-deformation unit is provided with an upper mould and a lower mould therein, the upper mould engages the lower mould to pre-deform a flat decorative film, and a pre-deformation decorative film matching a shape of the surface of the 3D glass is obtained; and providing the pre-deformed decorative film for an attachment unit, wherein the attachment unit defines a sealing chamber and includes a mould and a gas bag within the sealing chamber, the 3D glass is positioned on the mould, and the gas bag attaches the deformed decorative film to the surface of the 3D glass.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may he employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 is a flowchart of a method of processing a 3D glass decorative film.

DETAILED DESCRIPTION OF THE EMBODIMENTS

Figure 1:
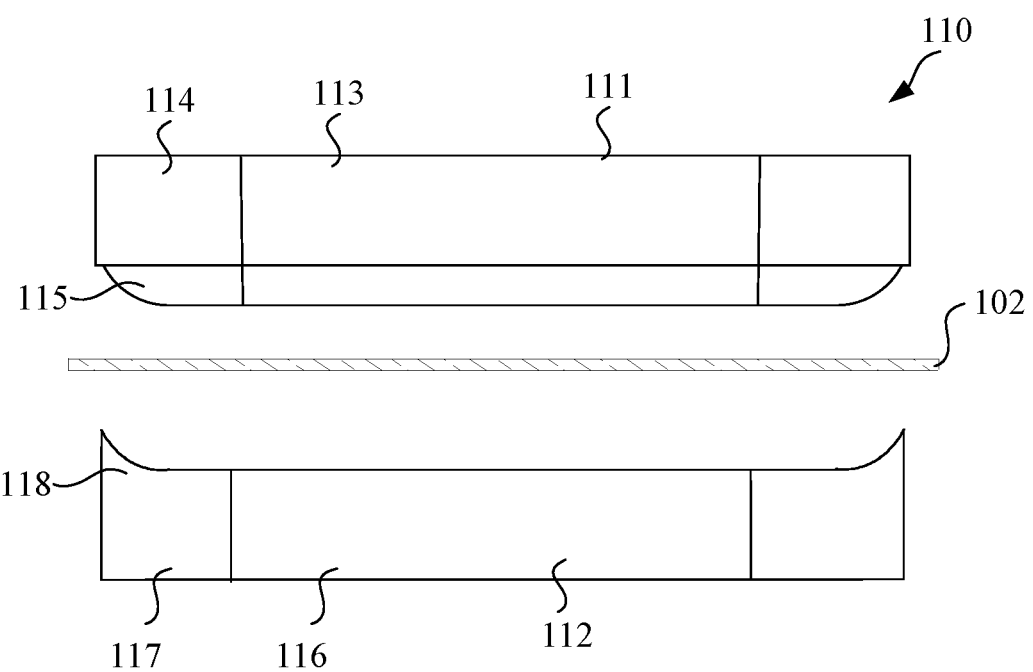
FIG. 1 is schematic view of a decorative film pre-deformation unit of a 3D processing device according to an embodiment of the present disclosure.
Figure 2:
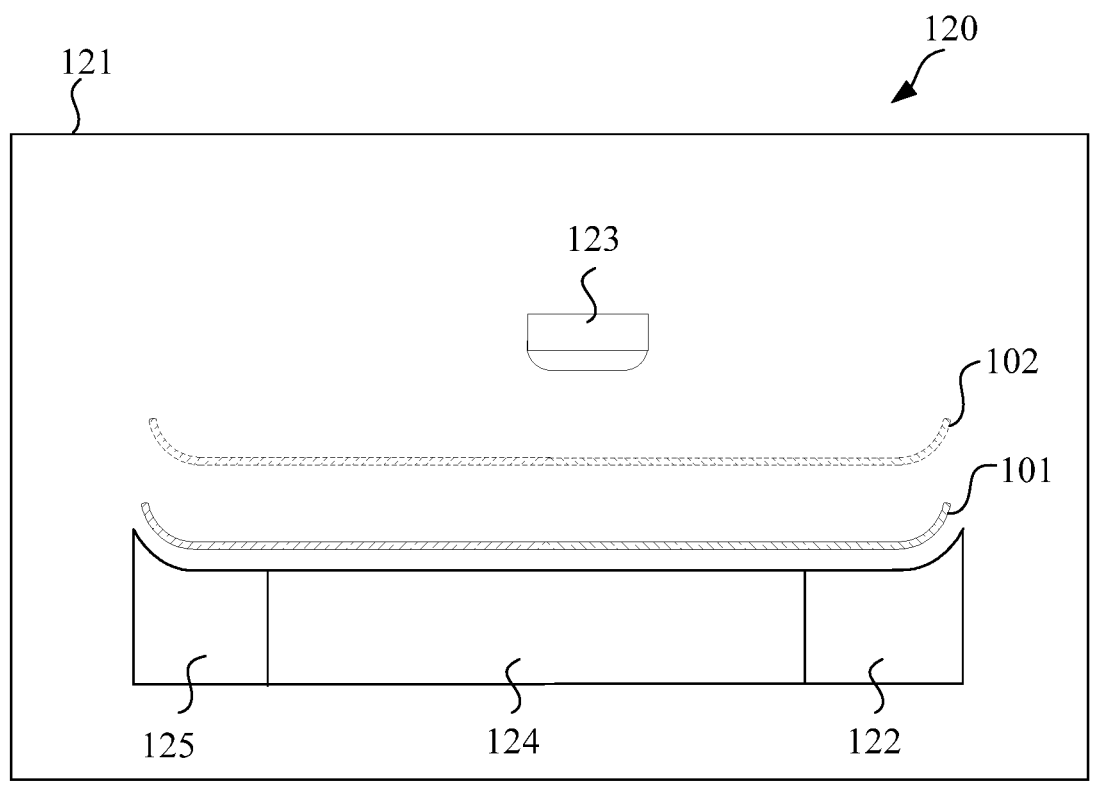
FIG. 2 is a schematic view of an attachment unit of a 3D processing device according to an embodiment of the present disclosure.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention As shown in FIG. 1 and FIG. 2, a 3D processing device according to an embodiment is provided. The 3D decorative film processing device is configured to attach the decorative film 102 on a surface of the 3D glass. The 3D processing device includes a decorative film pre-deformation unit 110, and an attachment unit 120.

As shown in FIG. 1, the decorative film pre-deformation unit 110 includes an upper mould 111 and a lower mould 112 opposite to the upper mould 111. The upper mould 111 engages the lower mould 112 to press the decorative film 102 and causes the decorative film 102 to have a shape matching the surface of the 3D glass 101.

According to an embodiment, the upper mould 111 includes an upper planar pressing portion 113 and an upper curved portion 114 on an edge of the upper planar pressing portion 113. The upper planar pressing portion 113 is configured to correspond to a portion of the decorative film 102 which is corresponding to the planar portion of the 3D glass 101. The upper curved portion 114 is configured to correspond to a portion of the decorative film 102 which is corresponding to the curved portion of the 3D glass 101.

Further, the upper planar pressing portion 113 and the upper curved portion 114 can be independently configured, i.e. the upper planar pressing portion 113 can move relative to the upper curved portion 114, or the upper planar pressing portion 113 can be disassembled from the upper curved portion 114. The upper planar pressing portion 113 and the upper curved portion 114 can be controlled independently when the upper planar pressing portion 113 is movably assembled to the upper curved portion 114. For example, when the mould is sealed, the upper planar pressing portion 113 presses and positions the decorative film 102, and then the upper curved portion 114 presses and causes the decorative film 102 to be deformed. In addition, the detachable assembly can achieve the following advantages: when performing a attach and processing of the decorative film 102 to the 3D glass of different type and different curved extent, different upper planar pressing portion 113 and different upper curved portion 114 can be assembled to match the 3D glass 101.

The upper curved portion 114 is provided with a first heating block 115. The first heating block 115 can beat and make the decorative film 102 softer when the mould is sealed.

In an alternative embodiment, the first heating block 115 is not only mounted on the upper curved portion 114 for heating the portion of the decorative film 102 which is required to be deformed, but also positioned on the upper planar pressing portion 113, thus it can beat and make the whole decorative film 102, softer, facilitate for the attaching of the decorative film 102 to the 3D glass 101.

The lower mould 112 includes a lower planar pressing portion 116 and a lower curved portion 117 on an edge of the lower planar pressing portion 116. The lower pressing portion 116 is configured to correspond to a portion of the decorative film 102 which is corresponding to the planar portion of the 3D glass 101. The lower pressing portion 117 is configured to correspond to a portion of the decorative film 102 which is corresponding to the curved portion of the 3D glass 101.

Further, the lower pressing portion 116 and the lower curved portion 117 are independently configured, i.e. the lower pressing portion 116 can move relative to the lower curved portion 117, or the lower pressing portion 116 can be disassembled from the lower curved portion 117

The lower curved portion 117 is provided with a second heating block 118. The second heating block 118 has a function same as that of the first heating block 115, it can beat and make the decorative film 102 softer when the mould is sealed, facilitate for the pre-deformation of the decorative film 102.

In an alternative embodiment, the second heating block 118 is not only mounted on the lower curved portion 117 for heating the portion of the decorative film 102 which is required to he deformed, but also positioned on the lower planar pressing, portion 116, thus it can beat and make the whole decorative film 102 softer.

As shown in FIG. 2, the attachment unit 120 defines a sealing chamber 121, and includes a mould 122 and a gas bag 130. The mould 122 and the gas bag 123 are positioned within the sealing chamber 121.

The mould 122 is configured to support the 3D glass 101, thus the surface profile of the mould 122 matches the surface profile of the 3D glass 101. In an alternative embodiment, the mould 122 further includes a planar pressing portion 124 and a curved portion 125 which are configured independently. The curved portion 125 is positioned on a side of the planar pressing portion 124.

The gas bag 123 is configured to attach the deformed decorative film 102 (as shown in the dashed line in FIG. 2) provided by the decorative film pre-deformation unit on the surface of the 3D glass 101. Because the pre-deformation of the decorative film is prior to attach, thus the decorative film 102 can match the surface of the 3D glass 101 to be attached, thus it can possess a better attaching effect, avoiding a twining of the curved portion of the decorative film 102.

According to an alternative embodiment, the sealing chamber 121 can be evacuated, in the attaching process, the sealing chamber 121 maintains an vacuum environment, the bubbles between the decorative film 102 and the 3D glass 101 can be avoided In an alternative embodiment, aforementioned decorative film pre-deformation unit 110 can be positioned within the sealing chamber 121. The deformation process and attaching process of the decorative film are accomplished in the sealing chamber 121. Further, the lower mould 112 of aforementioned decorative film pre-deformation unit 110 can be shared by the mould 124 of the attachment unit 120. For example, the upper mould 111 of the decorative film pre-deformation unit 110 is configured to be replaced by the gas bag 123 of the attachment unit 120. When the decorative film 102 is required to be pre-deformation, the upper mould 111 is configured to be above the mould 124. When the decorative film 102 is required to he pressed, the gas bag 123 is configured to be above the mould 124.

Referring to FIG. 3, The present disclosure further discloses a 3D glass decorative film processing method, which includes the following steps:

A decorative film pre-deformation unit is provided, the decorative film pre-deformation unit is provided with an upper mould and a lower mould therein, the upper mould engages the lower mould to pre-deform the flat decorative film, and a pre-deformation decorative film matching a shape of the surface of the 3D glass is obtained;

The pre-deformed decorative film is provided for the attachment unit, the attachment unit defines a sealing chamber and includes a mould and a gas bag within the sealing chamber, the 3D glass is positioned on the mould, and the gas bag attaches the deformed decorative film to the surface of the 3D glass.

In can be understood that, the processing device provided by aforementioned method can be a processing device according to any one of aforementioned embodiments. For example, the decorative film pre-deformation unit can press the decorative film and heat the decorative film at the same time to make the decorative film softer. The heating structure can be a heating block positioned on the upper mould or the lower mould. Furthermore, prior to attaching, a vacuum treatment is performed to the sealing chamber of the attachment unit, enabling the whole attaching process to be performed in a vacuum environment For another embodiment, aforementioned decorative film pre-deformation unit can be positioned in the sealing chamber. For another embodiment, the lower mould of the decorative film pre-deformation unit can be shared by the mould of the attachment unit.

Technical features of above embodiments can be combined arbitrary, for simple, any combination of every technical feature in above embodiments is not all illustrated. However, the technical features which are not contradicted to each other may fall into the scope of the specification The above are several embodiments of the present invention described in detail, and should not he deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. A 3D processing device for attaching a decorative film on a surface of a 3D glass, comprising:
    a decorative film pre-deformation unit comprising:
        an upper mould and a lower mould opposite to the upper mould, wherein the upper mould engages the lower mould to press the decorative film and cause the decorative film to have a shape matching the surface of the 3D glass;
        the upper mould further comprises an upper planar pressing portion and an upper curved portion on an edge of the upper planar pressing portion, the lower mould comprises a lower planar pressing portion and a lower curved portion on an edge of the lower planar pressing portion, the upper planar pressing portion and the lower planar pressing portion are configured to correspond to portions of the decorative film which are corresponding to the planar portion of the 3D glass, the upper curved portion and the lower curved portion are configured to correspond to portions of the decorative film which are corresponding to the curved portion of the 3D glass; and
    an attachment unit defining a sealing chamber and comprising an attachment unit lower mould and a gas bag within the sealing chamber, wherein the attachment unit lower mould is configured to support the 3D glass, the air bag is configured to attach a deformed decorative film provided by the decorative film pre-deformation unit on the surface of the 3D glass.

2. The device according to claim 1, wherein the upper planar pressing portion and the upper curved portion are independently configured, and the upper curved portion is provided with a first heating block.

3. The device according to claim 2, wherein the first heating block covers the upper planar pressing portion.

4. The device according to claim 1, wherein the lower planar pressing portion and the lower curved portion are independently configured.

5. The device according to claim 4, wherein the lower curved portion is provided with a second heating block for heating the decorative film.

6. The device according to claim 5, wherein the second heating block covers the lower planar pressing portion and is configured for heating the decorative film.

7. The device according to claim 1, wherein the lower planar pressing portion is moveable in relation to the lower curved portion of the lower mould, and the upper planar pressing portion is moveable in relation to the upper curved portion of the upper mould.

8. The device according to claim 1, wherein the gas bag is located above the deformed decorative film.

9. The device according to claim 8, wherein the gas bag is configured to press against the deformed decorative film for attaching to the 3D glass.

* * * * *